(12) United States Patent
Poulin et al.

(10) Patent No.: US 8,813,900 B2
(45) Date of Patent: Aug. 26, 2014

(54) VEHICLE EXHAUST SYSTEM

(71) Applicant: Bombardier Recreational Products Inc., Valcourt (CA)

(72) Inventors: Etienne Poulin, St-Denis de Brompton (CA); Robert Lachance, Valcourt (CA)

(73) Assignee: Bombardier Recreational Products Inc., Valcourt, Quebec ( * ) Notice: Subject to any disclaimer, the term of this patent is extended or adjusted under 35 U.S.C. 154(b) by 0 days.

(21) Appl. No.: 13/664,519

(22) Filed: Oct. 31, 2012

(65) Prior Publication Data

US 2014/0116796 A1 May 1, 2014

(51) Int. Cl.
*B60K 13/04* (2006.01)
*B60K 5/00* (2006.01)
*F01N 3/00* (2006.01)

(52) U.S. Cl.
CPC . *B60K 13/04* (2013.01); *B60K 5/00* (2013.01); *F01N 3/00* (2013.01)
USPC .......................................................... 180/309

(58) Field of Classification Search
USPC .......... 180/309, 219, 225, 296; 181/227, 265, 181/228, 247, 248–249, 250, 251, 264, 181/282; 60/313, 323, 324; 29/890.08
See application file for complete search history.

(56) References Cited

U.S. PATENT DOCUMENTS

| | | | | |
|---|---|---|---|---|
| 6,370,869 | B1 * | 4/2002 | Hirota et al. | 60/276 |
| 6,546,722 | B2 * | 4/2003 | Sagara et al. | 60/324 |
| 6,764,361 | B1 * | 7/2004 | Matsuda | 440/89 B |
| 8,393,433 | B2 * | 3/2013 | Inoue et al. | 180/309 |
| 2009/0000282 | A1 * | 1/2009 | Gruber | 60/299 |

* cited by examiner

*Primary Examiner* — John Walters
*Assistant Examiner* — James Triggs
(74) *Attorney, Agent, or Firm* — BCF LLP

(57) ABSTRACT

A vehicle exhaust system has a first exhaust pipe adapted to be connected to a first exhaust port of an engine, a first expansion chamber connected to the first exhaust pipe, a second exhaust pipe adapted to be connected to a second exhaust port of an engine, a second expansion chamber connected to the second exhaust pipe, a collector connected to the first and second expansion chambers, a third exhaust pipe connected to the collector, and a first muffler connected to the third exhaust pipe. A vehicle having the vehicle exhaust system is also disclosed.

28 Claims, 13 Drawing Sheets

FIG. 3

VEHICLE EXHAUST SYSTEM

FIELD OF THE INVENTION

The present invention relates to an exhaust system for a vehicle.

BACKGROUND

Vehicles powered by internal combustion engines are provided with exhaust systems connected to the exhaust ports of the engine. The design of the exhaust system has an effect on the power output of the engine, the noise level and sound signature generated by the engine. The exhaust system also assists in controlling the pollution generated by the engine. However, the design choices for an exhaust system that maximizes power output are generally contradictory to the design choices for an exhaust system that minimizes noise level and optimizes sound signature. A reasonable trade-off therefore has to be reached in the design.

In order to maximize power, it is known to have long exhaust pipes connected to the exhaust ports. In order to minimize noise, it is known to include expansion chambers such as resonator and mufflers in the exhaust system. Long exhaust pipes and expansion chambers take a lot of room in a vehicle.

In many vehicles, such as off-road side-by-side vehicles (SSVs), the amount of room available for the various vehicle components is limited. In a SSV for example, the cockpit area has low seats, therefore providing very little room for components under the seats, and most of the remaining volume has to be free in order to accommodate the riders of the vehicle. The portions of the SSV forward and rearward of the cockpit area are relatively short and mostly occupied by the drive train and suspension components (and steering components at the front), thus leaving little room for other components. Also, in view of the operating conditions of SSVs, typically rough, unpaved terrain, designers of SSVs try as much as possible not to have any components extending below the frame of the vehicle as these could get damaged. As such, there is not a lot of room to place components of an exhaust system, especially one with long exhaust pipes and expansion chambers.

There is therefore a need for an exhaust system for a vehicle which provides an acceptable trade-off between engine power output and noise level while fitting in a limited amount of space.

SUMMARY

It is an object of the present invention to ameliorate at least some of the inconveniences present in the prior art.

In one aspect, embodiments of the present invention provide a vehicle exhaust system having a first exhaust pipe adapted to be connected to a first exhaust port of an engine, a first expansion chamber connected to the first exhaust pipe, a second exhaust pipe adapted to be connected to a second exhaust port of an engine, a second expansion chamber connected to the second exhaust pipe, a collector connected to the first and second expansion chambers, a third exhaust pipe connected to the collector, and a first muffler connected to the third exhaust pipe.

In an additional aspect, a fourth exhaust pipe is connected to the collector, and a second muffler is connected to the fourth exhaust pipe.

In a further aspect, a catalytic converter is connected downstream of the collector and upstream of the third exhaust pipe.

In an additional aspect, exhaust gases from the first and second exhaust pipes flow through the catalytic converter.

In a further aspect, the first and second expansion chambers are adjacent to each other.

In an additional aspect, the first and second expansion chambers are received in part inside the collector.

In a further aspect, the first expansion chamber is a first resonator and the second expansion chamber is a second resonator.

In an additional aspect, the first exhaust pipe extends through the first resonator. The first exhaust pipe has an end disposed inside the collector. A portion of the first exhaust pipe disposed inside the first resonator defines at least one aperture fluidly communicating the first exhaust pipe with the first resonator. The second exhaust pipe extends through the second resonator. The second exhaust pipe has an end disposed inside the collector. A portion of the second exhaust pipe disposed inside the second resonator defines at least one aperture fluidly communicating the second exhaust pipe with the second resonator.

In a further aspect, each of the first and second exhaust pipes is longer than each of the third and fourth exhaust pipes.

In an additional aspect, a flow of exhaust gases inside the first exhaust pipe and the first expansion chamber is separate from a flow of exhaust gases inside the second exhaust pipe and the second expansion chamber. The flow of exhaust gases from the first exhaust pipe and the first expansion chamber is mixed with the flow of exhaust gases from the second exhaust pipe and the second expansion chamber inside the collector.

In another aspect, embodiments of the present invention provide a vehicle having a frame and an internal combustion engine mounted to the frame. The internal combustion engine has a first exhaust port and a second exhaust port. A first exhaust pipe is connected to the first exhaust port. A first expansion chamber is connected to the first exhaust pipe. The first expansion chamber is disposed rearward of the engine. A second exhaust pipe is connected to the second exhaust port. A second expansion chamber is connected to the second exhaust pipe. The second expansion chamber is disposed rearward of the engine. A collector is connected to the first and second expansion chambers. A third exhaust pipe is connected to the collector. A first muffler is connected to the third exhaust pipe, the first muffler being disposed rearward of the collector.

In a further aspect, a fourth exhaust pipe is connected to the collector, and a second muffler is connected to the fourth exhaust pipe. The second muffler is disposed rearward of the collector.

In an additional aspect, a catalytic converter is connected downstream of the collector and upstream of the third exhaust pipe.

In a further aspect, exhaust gases from the first and second exhaust pipes flow through the catalytic converter.

In an additional aspect, the first and second expansion chambers are adjacent to each other.

In a further aspect, the first and second expansion chambers are received in part inside the collector.

In an additional aspect, the first expansion chamber is a first resonator and the second expansion chamber is a second resonator.

In a further aspect, the first exhaust pipe extends through the first resonator. The first exhaust pipe has an end disposed inside the collector. A portion of the first exhaust pipe disposed inside the first resonator defines at least one aperture fluidly communicating the first exhaust pipe with the first resonator. The second exhaust pipe extends through the second resonator. The second exhaust pipe has an end disposed inside the collector. A portion of the second exhaust pipe disposed inside the second resonator defines at least one aperture fluidly communicating the second exhaust pipe with the second resonator.

In an additional aspect, each of the first and second exhaust pipes is longer than each of the third and fourth exhaust pipes.

In a further aspect, the engine is a V-type engine having a first cylinder and a second cylinder. The first exhaust port fluidly communicates with the first cylinder and faces generally toward a front of the vehicle. The second exhaust port fluidly communicates with the second cylinder and faces toward a rear of the vehicle.

In an additional aspect, a driver seat is mounted to the frame. The driver seat has a seat bottom and a backrest. Two front wheels are mounted to the frame forwardly of the driver seat. Two rear wheels are mounted to the frame rearward of the driver seat. The first expansion chamber, the second expansion chamber and the collector are disposed rearward of the backrest.

In a further aspect, each of the two rear wheels rotate about a rear wheel rotation axis. The first expansion chamber, the second expansion chamber and the collector are disposed forwardly of the rear wheel rotation axes.

In an additional aspect, a cargo rack is mounted to the frame rearward of the backrest. The first expansion chamber, the second expansion chamber and the collector are disposed at least in part below the cargo rack.

In a further aspect, a driver seat is mounted to the frame. The driver seat has a seat bottom and a backrest. Two front wheels are mounted to the frame forwardly of the driver seat. Two rear wheels are mounted to the frame rearward of the driver seat. A cargo rack is mounted to the frame rearward of the backrest. The first and second mufflers are disposed at least in part below the cargo rack.

In an additional aspect, the first and second mufflers are disposed on opposite sides of a longitudinal centerline of the vehicle.

In a further aspect, the first and second expansion chambers each have an inlet. The inlets are disposed on a same side of a longitudinal centerline of the vehicle.

In an additional aspect, a flow of exhaust gases inside the first exhaust pipe and the first expansion chamber is separate from a flow of exhaust gases inside the second exhaust pipe and the second expansion chamber. The flow of exhaust gases from the first exhaust pipe and the first expansion chamber is mixed with the flow of exhaust gases from the second exhaust pipe and the second expansion chamber inside the collector.

For purposes of the present application, terms related to spatial orientation when referring to a vehicle, such as, but not limited to, "forwardly", "rearward", "front", "rear", "above", "below", "left" and "right", are as they would be understood by a driver of the vehicle sitting in the vehicle in a normal driving position, with the vehicle in a straight ahead orientation (i.e. not steered left or right). Terms related to spatial orientation when referring to a component of the vehicle should be understood as they would be understood when the component is installed in the vehicle.

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects and advantages of embodiments of the present invention will become apparent from the following description, the accompanying drawings and the appended claims.

BRIEF DESCRIPTION OF THE DRAWINGS

For a better understanding of the present invention, as well as other aspects and further features thereof, reference is made to the following description which is to be used in conjunction with the accompanying drawings, where:

FIG. 3 is a rear elevation view of the portions of the vehicle of FIG. 3;

DETAILED DESCRIPTION

Embodiments of the present invention will be described with respect to an off-road side-by-side vehicle (SSV). However, it contemplated that aspects of the embodiments of the present invention could also be used on other types of wheeled vehicles, such as, but not limited to, all-terrain vehicles (ATVs), motorcycles and snowmobiles.

Figure 1:
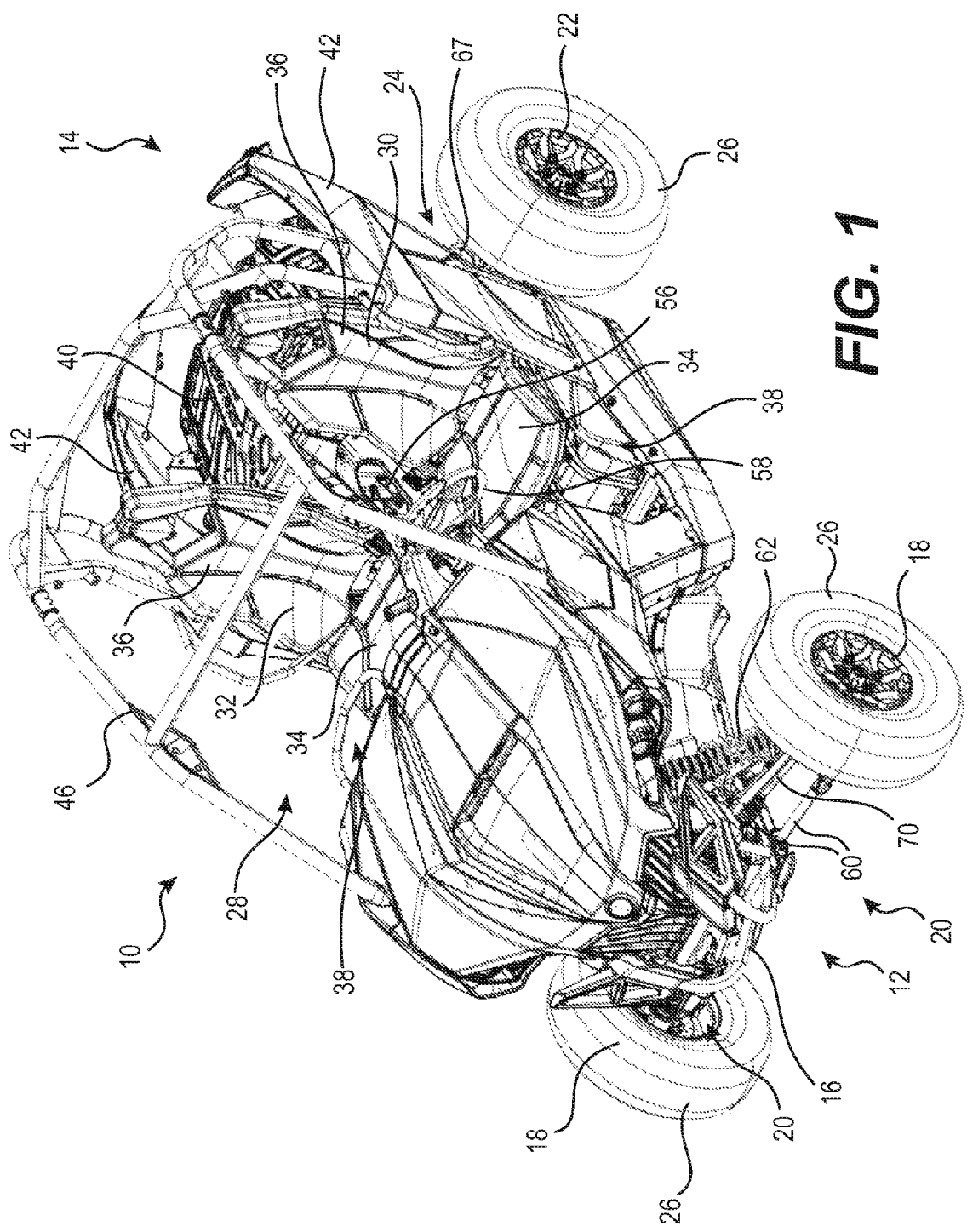
FIG. 1 is a perspective view of a vehicle taken from a front, left side thereof.

FIG. 1 illustrates a SSV 10 having a front end 12 and a rear end 14. The SSV 10 includes a frame 16 to which a vehicle body is mounted. The frame 16 will be described in greater detail below. A pair of front wheels 18 is suspended from the front portion of the frame 16 via front suspensions 20. A pair of rear wheels 22 is suspended from the rear portion of the frame 16 via rear suspensions 24. Each of the four wheels 18, 22 has a tire 26. It is also contemplated that the SSV 10 could have six or more wheels.

A cockpit area 28 is disposed in the middle portion of the frame 16. The cockpit area 28 comprises a driver seat 30 and a passenger seat 32 mounted laterally beside each other to the frame 16 to accommodate a driver and a passenger (riders) of the SSV 10 respectively. Each seat 30, 32 has a seat bottom 34 and a backrest 36. The cockpit area 28 is open at the two lateral sides of the SSV 10, forming two lateral passages 38 through which the riders can ingress and egress the SSV 10. A lateral cover (not shown), selectively disposed across each lateral passage 38, can be opened to clear the lateral passage 38 for egress or ingress. A cargo rack 40 is mounted to the frame 16 rearward of the backrests 36 of the seats 30, 32 as will be described in greater detail below. The cargo rack 40 is surrounded in part by two side body panels 42. A roll cage 46 is connected to the frame 16 and disposed above the cockpit area 28.

Figure 5:
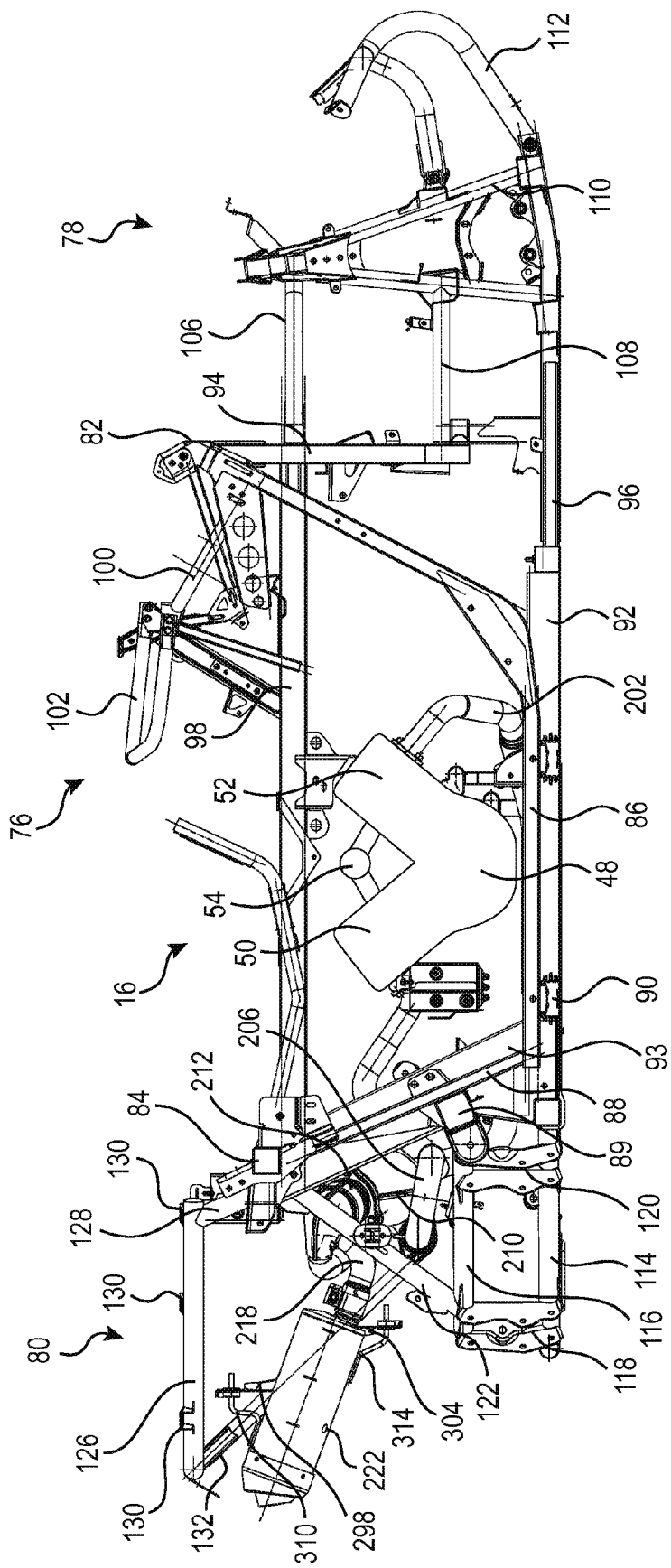
FIG. 5 is a right side elevation view of the frame, engine and exhaust system of the vehicle of FIG. 1.

An internal combustion engine 48 (shown schematically in FIG. 5) is mounted to the middle portion of frame 16 between the seats 30, 32. In the illustrated embodiment of the SSV 10, the engine 48 is a V-type engine having a front cylinder 50 and a rear cylinder 52 disposed at an angle to each other. Each cylinder 50, 52 has an intake port and an exhaust port (not shown). The intake ports are connected to an air intake manifold 54 (schematically shown in FIG. 5). The intake manifold 54 is connected to a throttle body (not shown) regulating the flow of air to the engine 48. The exhaust port of the front cylinder 50 faces generally toward the front of the SSV 10. The exhaust port of the rear cylinder 52 faces generally toward the rear of the SSV 10. The exhaust ports are connected to the exhaust system 200 described below. It is contemplated that other types of internal combustion engine could be used, such as, for example, an inline engine. It is also contemplated that the engine 48 could have more than two cylinders 50, 52 and that the intake and exhaust ports could be oriented differently. A console 56, positioned between seats 30, 32 covers the engine 48.

A steering assembly including a steering wheel 58 is disposed in front of the driver seat 30. The steering assembly is operatively connected to the two front wheels 18 to permit steering of the SSV 10.

Each front suspension 20 includes lower and upper A-arms 60 pivotally connected at one end to the frame 16, and at the other end to the corresponding front wheel 18. A shock absorber 62 is connected between the outer end of each upper A-arm 60 and the frame 16. A sway bar (not shown), disposed rearward of the front suspensions 20, is connected to both upper A-arms 60 to increase the roll stiffness of the front suspensions 20.

Figure 2:
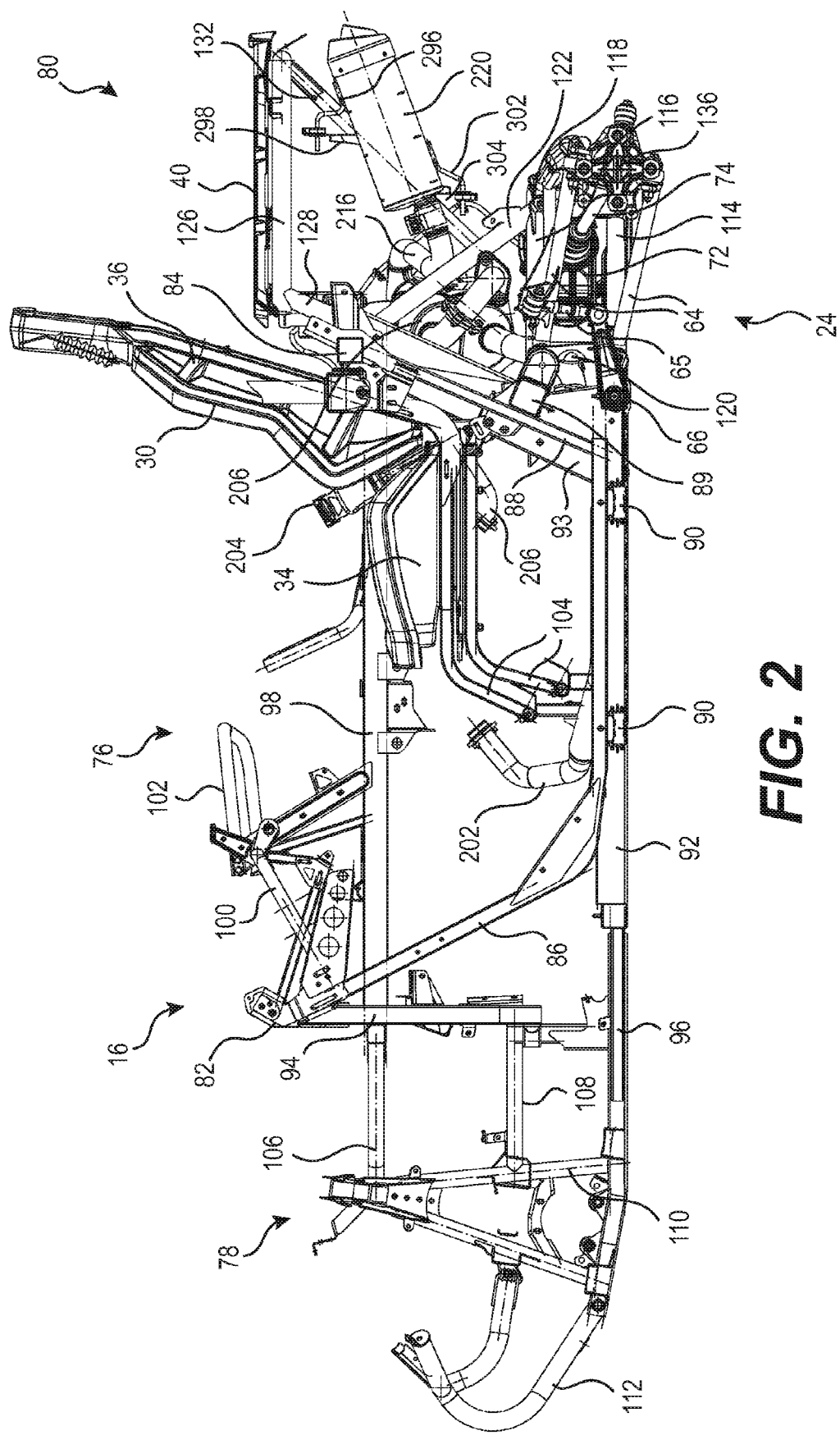
FIG. 2 is a left side elevation view of a frame, seats, exhaust system and rear wheels support and drive mechanism of the vehicle of claim 1.

Each rear suspension 24 includes lower and upper A-arms 64 (FIGS. 2 and 3) pivotally connected at one end to the frame 16, and at the other end to the corresponding rear wheel 22. As can be seen in FIG. 2, the upper A-arm 64 of each rear suspension 24 is pivotally connected by a linkage 65 to a swing arm 66. The swing arm 66 is disposed below the upper A-arm 64 and is pivotally connected to the frame 16 about an axis that is forward of the A-arms 64. A shock absorber 67 (FIG. 1) is connected between the outer end of each upper A-arm 64 and the frame 16. Toe links 68 are pivotally connected at one end to the frame 16, and at the other end to their corresponding rear wheel 22 to maintain the rear wheels 22 in a generally straight ahead orientation. The length of the toe links 68 can be adjusted to give the rear wheels 22 some toe in or some toe out.

Figure 3:
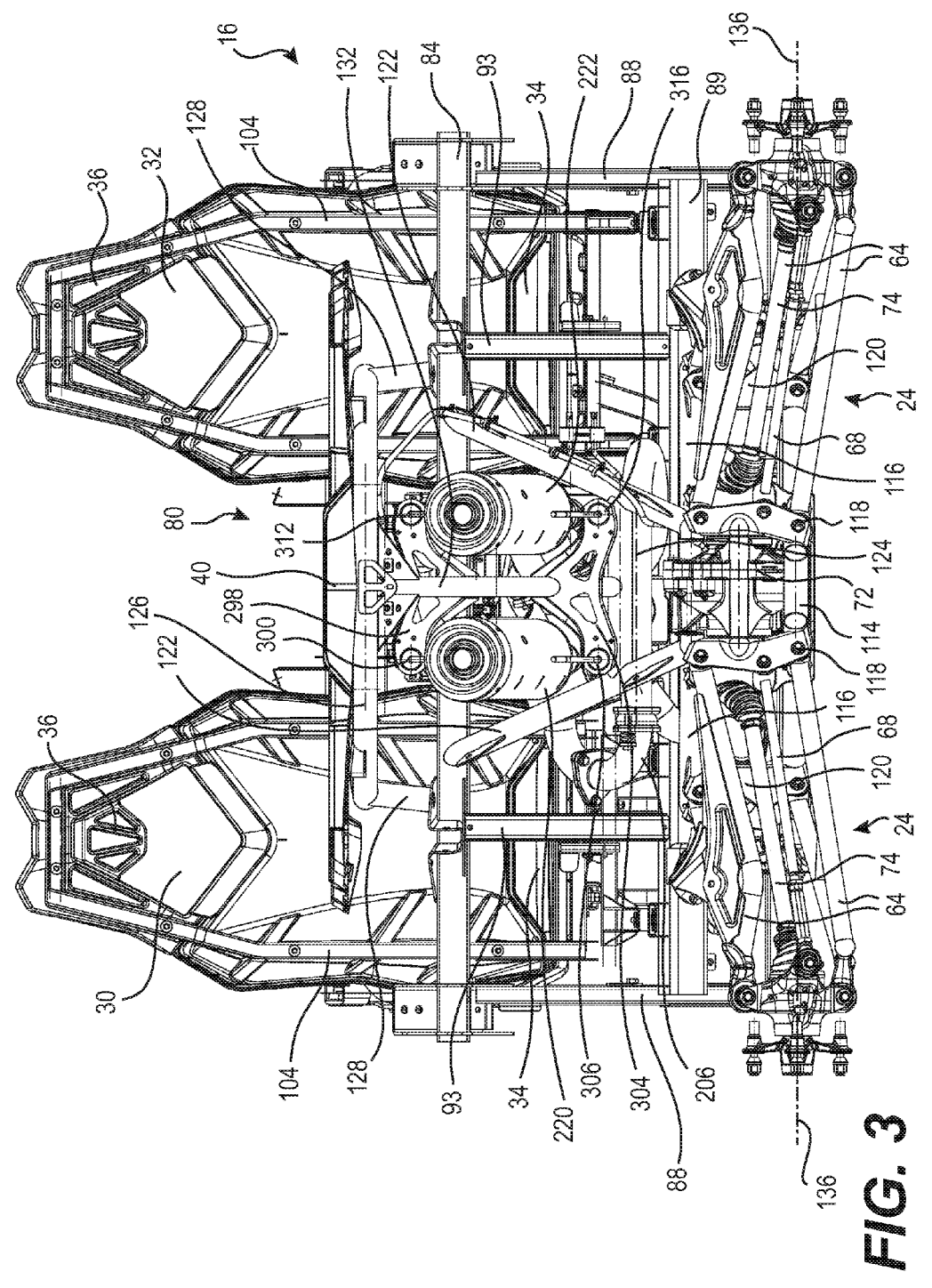

To drive the front wheels 18, the engine 48 is connected to a front driveshaft (not shown), which is in turn connected to a front differential (not shown). The front differential transfers the torque from the front driveshaft to left and right half-shafts 70 (only one of which is shown in FIG. 1). The half-shafts 70 are connected to their respective front wheels 18. Similarly, to drive the rear wheels 22, the engine 48 is connected to a rear driveshaft (not shown), which is in turn connected to a rear differential 72 (best seen in FIG. 3). The rear differential 72 transfers the torque from the rear driveshaft to left and right half-shafts 74 (FIG. 3). The half-shafts 74 are connected to their respective rear wheels 22.

The SSV 10 has other features and components such as headlights and handles. As it is believed that these features and components would be readily recognized by one of ordinary skill in the art, further explanation and description of these components will not be provided herein.

Figure 4:
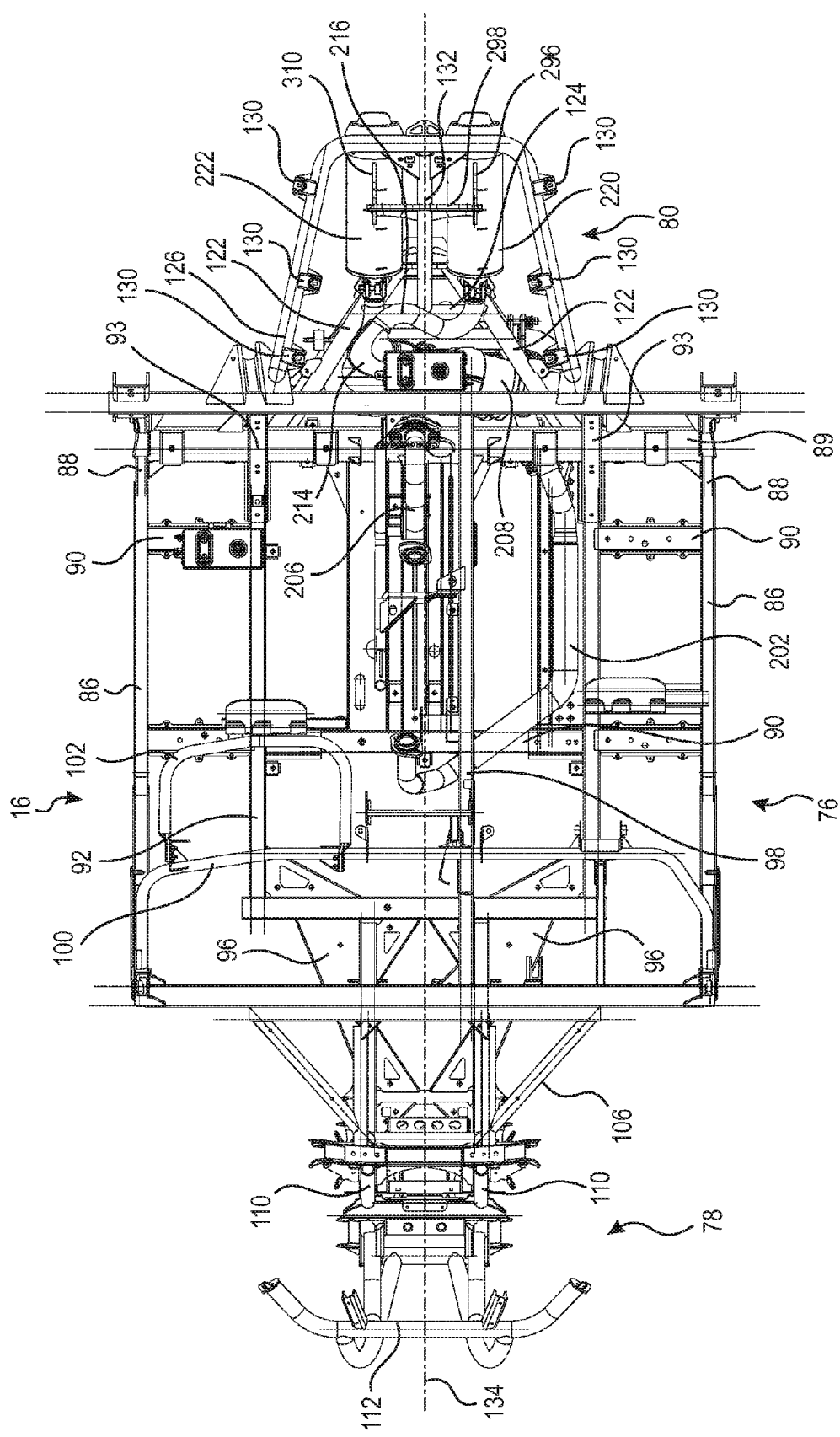
FIG. 4 is a top plan view of the frame and exhaust system of the vehicle of FIG. 1.

Turning now to FIGS. 2 to 5, the frame 16 of the vehicle will be described in more detail. For simplicity, only the main elements of the frame 16 will be described. It is contemplated that the SSV 10 could have a frame 16 that is different from the one described below. The frame 16 has a central frame portion 76, a front frame portion 78 connected to the front of the central fame portion 76 and a rear frame portion 80 connected to the back of the central frame portion 76. As can be seen in FIG. 4, the front and rear frame portions 78, 80 are narrower than the central frame portion 76.

The central frame portion 76 defines, together with the roll cage 46, the cockpit area 28. The central frame portion 76 is also used to mount the seats 30, 32 and the engine 48. The central frame portion 76 has a front upper lateral member 82 and a rear upper lateral member 84. A frame member 86 extends downward and rearward from each end of the front upper lateral member 76 and then bends near a bottom of the frame 16 to extend longitudinally rearward. Frame members 88 extend between the rearward ends of the frame members 86 to the ends of the rear upper lateral member 84. A cross-member 89 extends laterally between the members 88. The lower portions of the frame members 86 connect via cross-members 90 to a lower rectangular frame assembly 92. The frame assembly 92 supports the engine 48. Member 93 extends upward and rearward from the frame assembly 92 to the rear upper lateral member 84. Members 94 extend downwardly from the front upper lateral member 82. Plates 96 extend between the front of the frame assembly 92 and the front frame portion 78. A longitudinal member 98 extends longitudinally between the seats 30, 32. The member 98 is connected at its front end to the front frame portion 78 and at its rear end to the rear frame portion 80. A U-shaped bar 100 is connected at its ends to the ends of the front upper lateral member 82 and the member 98. The U-shaped bar 100 extends upward and rearward from the front upper lateral frame member 82. Another U-shaped bar 102 is connected to the right side of the U-shaped bar 100. The U-shaped bar 102 serves has a grab bar for the passenger of the SSV 10. Seat frames 104 are connected to the cross-members 90, the lower rectangular frame assembly 92, the frame members 88, and the longitudinal member 98. The seats 30, 32 are mounted to the seat frames 104.

The front frame portion 78 provides the connection points for the front suspensions 20 and is used to mount the front differential. The front frame portion 78 has upper and lower trusses 106, 108 connected to the members 94 of the central frame portion 76. Two triangular frame assemblies 110 are connected to the front of the trusses 106, 108. Each triangular frame assembly 110 provides mounting points for its corresponding front suspension 20. A bumper 112 is connected to the front of the frame assemblies 110.

The rear frame portion 80 provides the connection points for the rear suspensions 24 and is used to mount the rear differential 72. The rear frame portion 80 has a trapezoidal frame assembly 114 connected at its front to the rear of the lower rectangular frame assembly 92. Two members 116 are disposed above the assembly 114. The members 116 are connected at their fronts to the cross-member 89 and extend rearward therefrom parallel to the sides of the assembly 92. Brackets 118 connect the rear of the members 116 to the rear of the assembly 114. Brackets 120 are also connected between the members 116 and the sides of the assembly 114 forward of the brackets 118. The brackets 118, 120 provide the attachment points for the A-arms 64 of the rear suspensions 24. The rear differential 72 sits in the space defined by the assembly 114 and the members 116. Members 122 connect to the rear ends of the members 116 and extend upward, forward, and laterally outward therefrom to the rear upper lateral member 84. A cross-member 124 is connected between the members 122. A generally trapezoidal-shaped tube 126 is connected by members 128 to the rear upper lateral member 84 so as to be disposed higher than the member 84. The tube 126 has a number of brackets 130 (FIG. 4) used to fasten the cargo rack 40 to the tube 128. A member 132 extends downward and forward from the rear part of the tube 126 to the cross-member 124. The member 132 is disposed along the longitudinal centerline 134 of the SSV 10.

Turning now to FIGS. 6 to 12, the exhaust system 200 will be described in more detail. The exhaust system 200 has an exhaust pipe 202 connected at one end to one exhaust port of the engine 48 and to an expansion chamber 204 at the other end and an exhaust pipe 206 connected at one end to the other exhaust port of the engine 48 and to an expansion chamber 208 at the other end. Both expansion chambers 204, 208 are connected to a collector 210. The collector 210 is connected to a catalytic converter 212 which is itself connected to a fitting 214. Two exhaust pipes 216, 218 are connected at one end to the fitting 214. The other end of the exhaust pipe 216 is connected to a muffler 220. The other end of the exhaust pipe 218 is connected to a muffler 222. It is contemplated that the exhaust pipe 218 and the muffler 222 could be omitted.

During operation of the engine 48, exhaust gases from the front cylinder 50 of the engine 48 flow in the exhaust pipe 202 and then in the expansion chamber 204, and exhaust gases from the rear cylinder 52 of the engine 48 flow in the exhaust pipe 206 and then in the expansion chamber 208. From the expansion chambers 204, 208 the flows of exhaust gases mix inside the collector 1210. It should be noted that the flow of exhaust gases inside the exhaust pipe 202 and the expansion chamber 204 remains separate from the flow of exhaust gases inside the exhaust pipe 206 and the expansion chamber 208 until the two flows are mixed in the collector 210. From the collector 210, the exhaust gases then flow through the catalytic converter 212. From the catalytic converter 212, the exhaust gases then enter the fitting 214 and are separated into two separate flows. From the fitting 214, part of the exhaust gases flow inside the exhaust pipe 216, then into the muffler 220 and out to the atmosphere, and part of the exhaust gases flow inside the exhaust pipe 218, then into the muffler 222 and out to the atmosphere.

Figure 6:
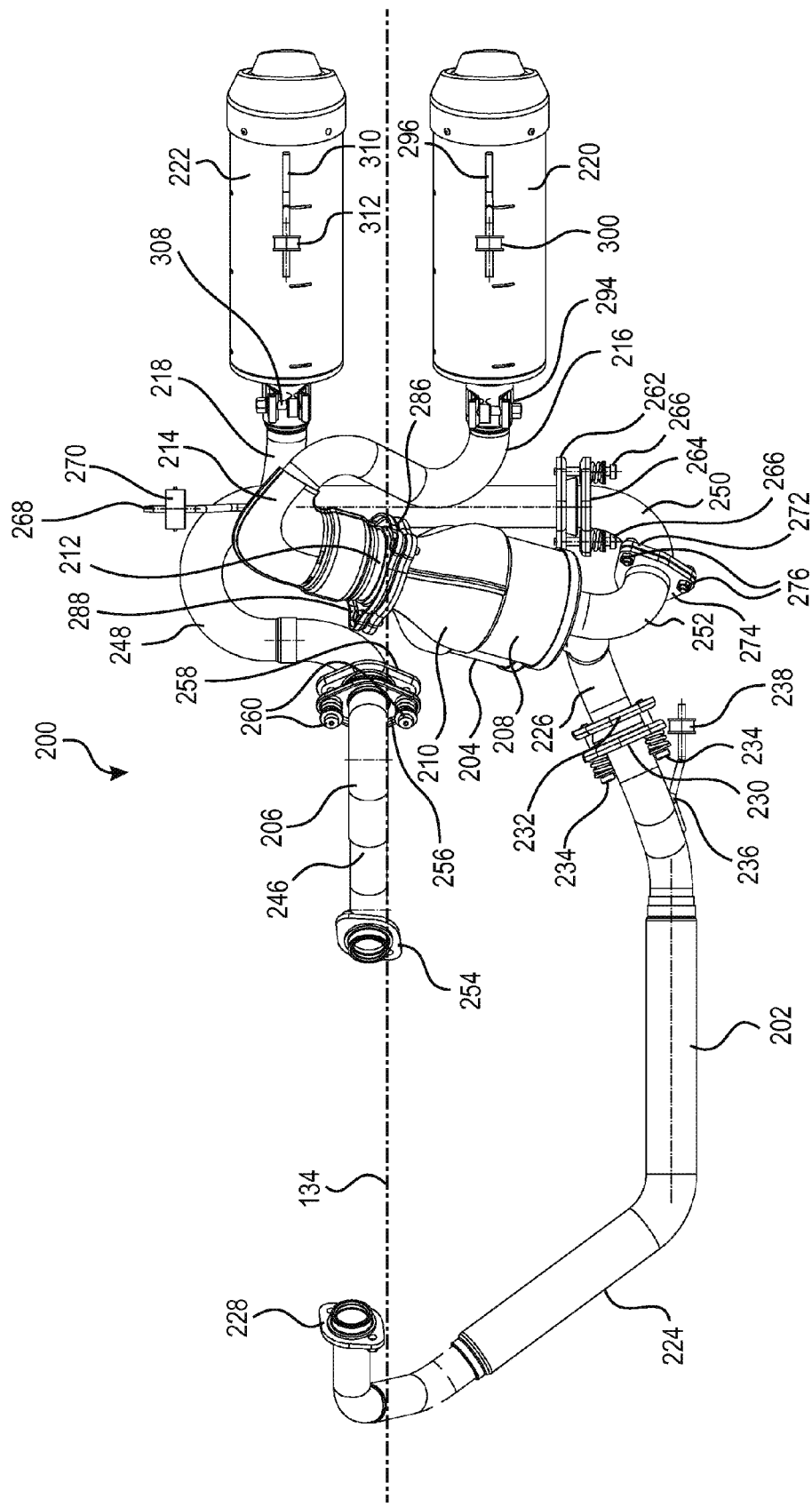
FIG. 6 is a top plan view of the exhaust system of the vehicle of FIG. 1.
Figure 12:
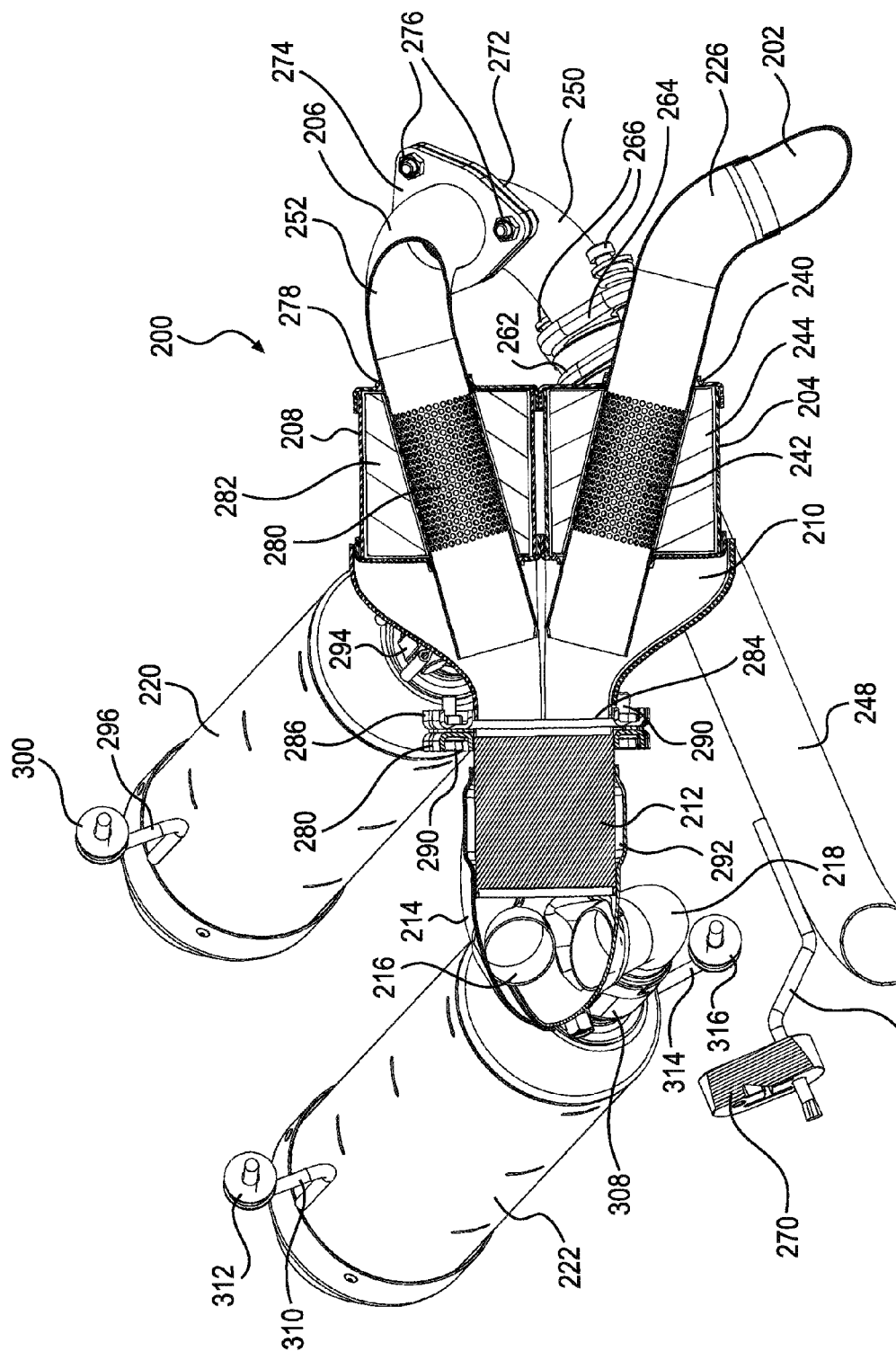
FIG. 12 is a cross-sectional view of the exhaust system of FIG. 6 taken through line A-A of FIG. 11.

The various components of the exhaust system 200 will now be described in more detail The exhaust pipe 202 has two main pipe sections 224, 226. It is contemplated that the exhaust pipe 202 could be made of a single pipe or of more than two main pipe sections. The pipe section 224 has a flange 228 used to fasten the exhaust pipe 202 to the front of the front cylinder 50 such that the end of the exhaust pipe 202 fluidly communicates with the exhaust port of the cylinder 50. The end of the exhaust pipe 202 that fluidly communicates with the exhaust port of the cylinder 50 is disposed on a right side of the longitudinal centerline 134 (FIG. 6). From the exhaust port, the pipe section 224 extends forward and downward, then rearward, downward and toward the left of the SSV 10, then rearward, and finally rearward, upward and toward the right of the SSV 10. As a result, the pipe section 224 passes under the driver seat 30. The downstream end of the pipe section 224 is inserted into the upstream end of the pipe section 226. A flange 230 on the downstream end of the pipe section 224 is fastened to a flange 232 on the upstream end of the pipe section 226 via spring-loaded fasteners 234. A support 236 welded to the downstream portion of the pipe section 224 is used to connect the exhaust pipe 202 to a bracket (not shown) on the central frame portion 76. A rubber damper 238 disposed between the support 236 and the bracket reduces the transmission of vibrations between the frame 16 and the exhaust system 200. From its upstream end, the pipe section 226 extends rearward, upward and toward the right of the SSV 10 into the expansion chamber 204. As best seen in FIG. 12, the pipe section 226 then extends through the expansion chamber 204 and its downstream end is disposed and opens inside the collector 210. The inlet 240 of the expansion chamber 204 (i.e. the aperture through which the pipe section 226 enter the expansion chamber 204) is disposed on a left side of the longitudinal centerline 134. The portion of the pipe section 226 that is disposed inside the expansion chamber 204 has a plurality of apertures 242 fluidly communicating that portion of the pipe section 226 with the interior of the expansion chamber 204. It is contemplated that there could be more or less apertures 242 and/or that the apertures 242 could be relatively bigger or smaller than illustrated. As such, the expansion chamber 204 in the present embodiment is a resonator. Sound absorbing material 244 is provided inside the expansion chamber 204 around the pipe section 226. It is contemplated that the sound absorbing material 244 could be omitted. As can be seen, the exhaust pipe 202 is longer than the exhaust pipes 216, 218. As can be seen in FIGS. 2 to 5, the expansion chamber 204 is disposed rearward of the engine 48 and the backrests 36, forward of the rotation axes 136 of the rear wheels 22, and in part below the cargo rack 40.

The exhaust pipe 206 has four main pipe sections 246, 248, 250, 252. It is contemplated that the exhaust pipe 206 could be made of a single pipe or of more or less than four main pipe sections. The pipe section 246 has a flange 254 used to fasten the exhaust pipe 206 to the rear of the rear cylinder 52 such that the end of the exhaust pipe 206 fluidly communicates with the exhaust port of the cylinder 52. The end of the exhaust pipe 206 that fluidly communicates with the exhaust port of the cylinder 52 is disposed on a right side of the longitudinal centerline 134 (FIG. 6). From the exhaust port, the pipe section 246 extends rearward and downward, then rearward and upward, and finally rearward and downward. As a result, the pipe section 246 passes over the cross-member 89 of the central frame portion 76. The downstream end of the pipe section 246 is inserted into the upstream end of the pipe section 248. A flange 256 on the downstream end of the pipe section 246 is fastened to a flange 258 on the upstream end of the pipe section 248 via spring-loaded fasteners 260. From its upstream end, the pipe section 248 extends rearward and downward, then toward the right of the SSV 10, then rearward toward the right of the SSV 10 and rearward toward the left of the SSV 10 in a generally U-shape, and finally toward the left of the SSV 10 across the longitudinal centerline 134. The downstream end of the pipe section 248 is inserted over the upstream end of the pipe section 250. A flange 262 on the downstream end of the pipe section 248 is fastened to a flange 264 on the upstream end of the pipe section 250 via spring-loaded fasteners 266. A support 268 welded to the top of the pipe section 248 is used to connect the exhaust pipe 206 to a bracket (not shown) on the rear frame portion 80. A rubber damper 270 disposed between the support 268 and the bracket reduces the transmission of vibrations between the frame 16 and the exhaust system 200. From its upstream end, the pipe section 250 extends toward the left of the SSV 10, upward and forward. The downstream end of the pipe section 250 has a flange 272 fastened to a flange 274 on the upstream end of the pipe section 252 via fasteners 276. From its upstream end, the pipe section 252 extends forward, upward and toward the right of the SSV 10 into the expansion chamber 208. As best seen in FIG. 12, the pipe section 252 then extends through the expansion chamber 208 and its downstream end is disposed and opens inside the collector 210. The inlet 278 of the expansion chamber 208 (i.e. the aperture through which the pipe section 252 enter the expansion chamber 208) is disposed on a left side of the longitudinal centerline 134. The portion of the pipe section 252 that is disposed inside the expansion chamber 208 has a plurality of apertures 280 fluidly communicating that portion of the pipe section 252 with the interior of the expansion chamber 208. It is contemplated that there could be more or less apertures 280 and/or that the apertures 280 could be relatively bigger or smaller than illustrated. As such, the expansion chamber 208 in the present embodiment is a resonator. Sound absorbing material 282 is provided inside the expansion chamber 208 around the pipe section 252. It is contemplated that the sound absorbing material 282 could be omitted. As can be seen, the exhaust pipe 206 is longer than the exhaust pipes 216, 218. As can be seen in FIGS. 2 to 5, the expansion chamber 208 is disposed rearward of the engine 48 and the backrests 36, forward of the rotation axes 136 of the rear wheels 22, and in part below the cargo rack 40.

The expansion chambers 204, 208 are adjacent to each other such that the expansion chamber 208 is disposed above and in contact with the expansion chamber 204. It is contemplated that the expansion chambers 204, 208 could be spaced apart. As best seen in FIG. 12, the right ends (on the left in FIG. 12) of the expansion chambers 204, 208 are received inside the left (on the right in FIG. 12), upstream, end of the collector 210. The left end of the collector 210 is welded around the expansion chambers 204, 208. As can also be seen in FIG. 12, the ends of pipe sections 226, 252 point toward the center of the collector 210 and the outlet 284 of the collector 210. The collector 210 is generally funnel-shaped and converges from its left end to its outlet 284 (FIG. 12). A flange 286 disposed around the outlet 284 of the collector 210 is fastened to a flange 288 on the upstream end of the catalytic converter 212 via fasteners 290. As can be seen in FIGS. 2 to 5, the collector 210 is disposed rearward of the engine 48 and the backrests 36, forward of the rotation axes 136 of the rear wheels 22, and in part below the cargo rack 40.

As best seen in FIG. 12, the catalytic converter 212 is received inside the fitting 214 such that a majority of the catalytic converter is housed in the fitting 214. As can be seen, the left end of the fitting 214 (on the right in FIG. 12) fits tightly around the catalytic converter 212. Similarly, the portion of the fitting 214 around the right end of the catalytic converter (on the left in FIG. 12) fits tightly around the catalytic converter 212. A space 292 is defined between the catalytic converter 212 and the fitting 214 between these tight fitting portions. As can also be seen in FIG. 12, the upstream ends of the exhaust pipes 216, 218 extend inside the chamber defined by the fitting 214 downstream of the catalytic converter 212.

Figure 7:
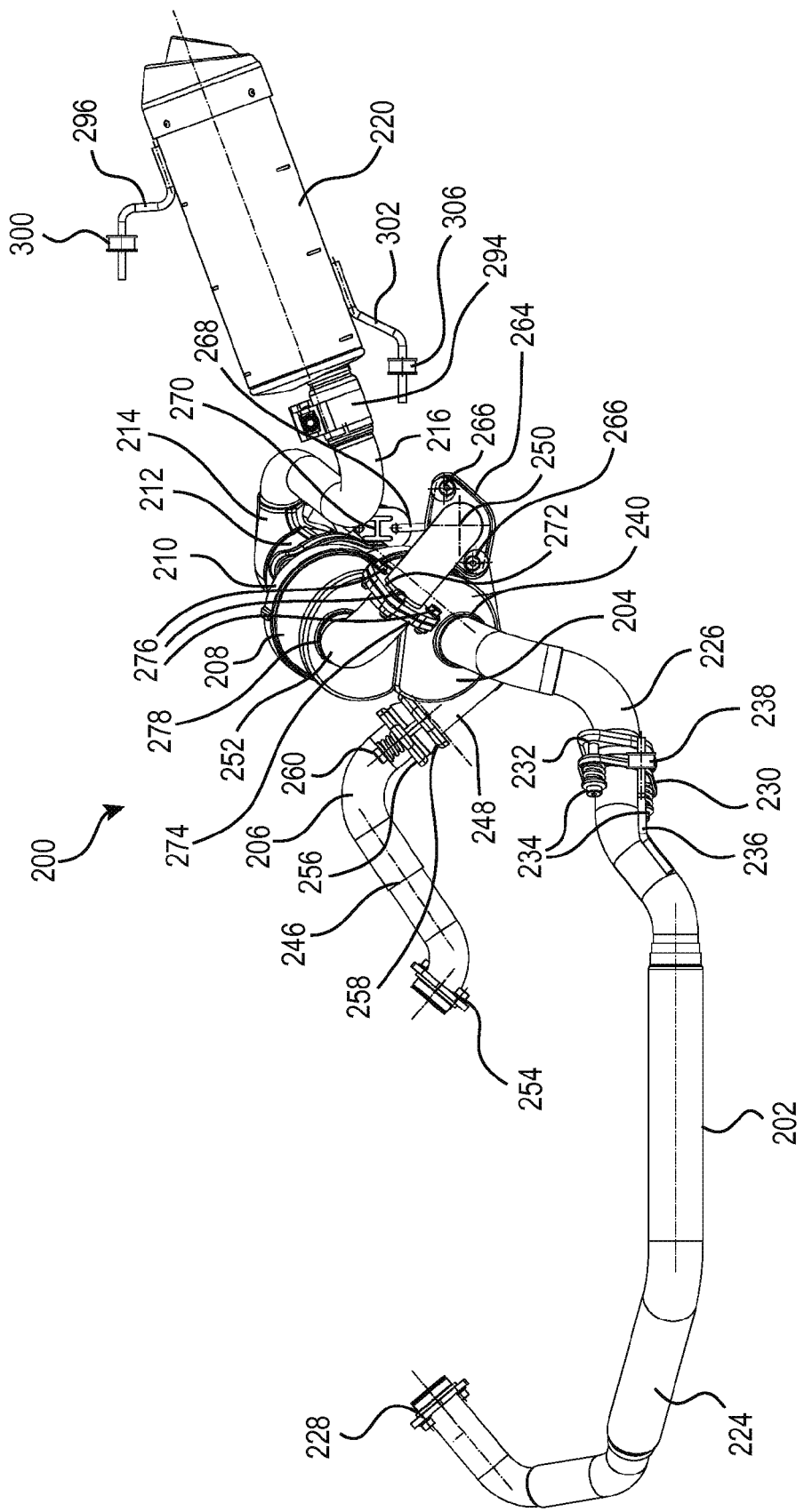
FIG. 7 is a left side elevation view of the exhaust system of FIG. 6.

The exhaust pipe 216 extends through an opening disposed in the rear of the fitting 214. From the fitting 214, the exhaust pipe 216 extends rearward, upward and toward the left of the SSV 10, then forward, downward and toward the left of the SSV 10, and finally rearward and upward into the muffler 220. The downstream end of the exhaust pipe 216 is received into the muffler 220. It is contemplated that the exhaust pipe 216 could be made of multiple sections fastened together. The muffler 220 is connected to the exhaust pipe 216 by a clamp 294. The muffler 220 is disposed rearward of the collector 210 on a left side of the longitudinal centerline 134. As best seen in FIG. 7, the muffler 220 extends rearward and upward from its upstream end. The muffler 220 has a number of chambers, pipes and/or baffles defined therein. A support 296 welded to the top of the muffler 220 is used to connect the muffler 220 to a bracket 298 (FIG. 3) connected to the member 132 on the rear frame portion 80. A rubber damper 300 disposed between the support 296 and the bracket 298 reduces the transmission of vibrations between the frame 16 and the exhaust system 200. A support 302 welded to the bottom of the muffler 220 forward of the support 296 is used to connect the muffler 220 to a bracket 304 (FIG. 3) connected to the member 132 below the bracket 298. A rubber damper 306 disposed between the support 302 and the bracket 304 reduces the transmission of vibrations between the frame 16 and the exhaust system 200. As can be seen in FIGS. 2 to 5, the muffler 220 is disposed in part below the cargo rack 40.

Figure 8:
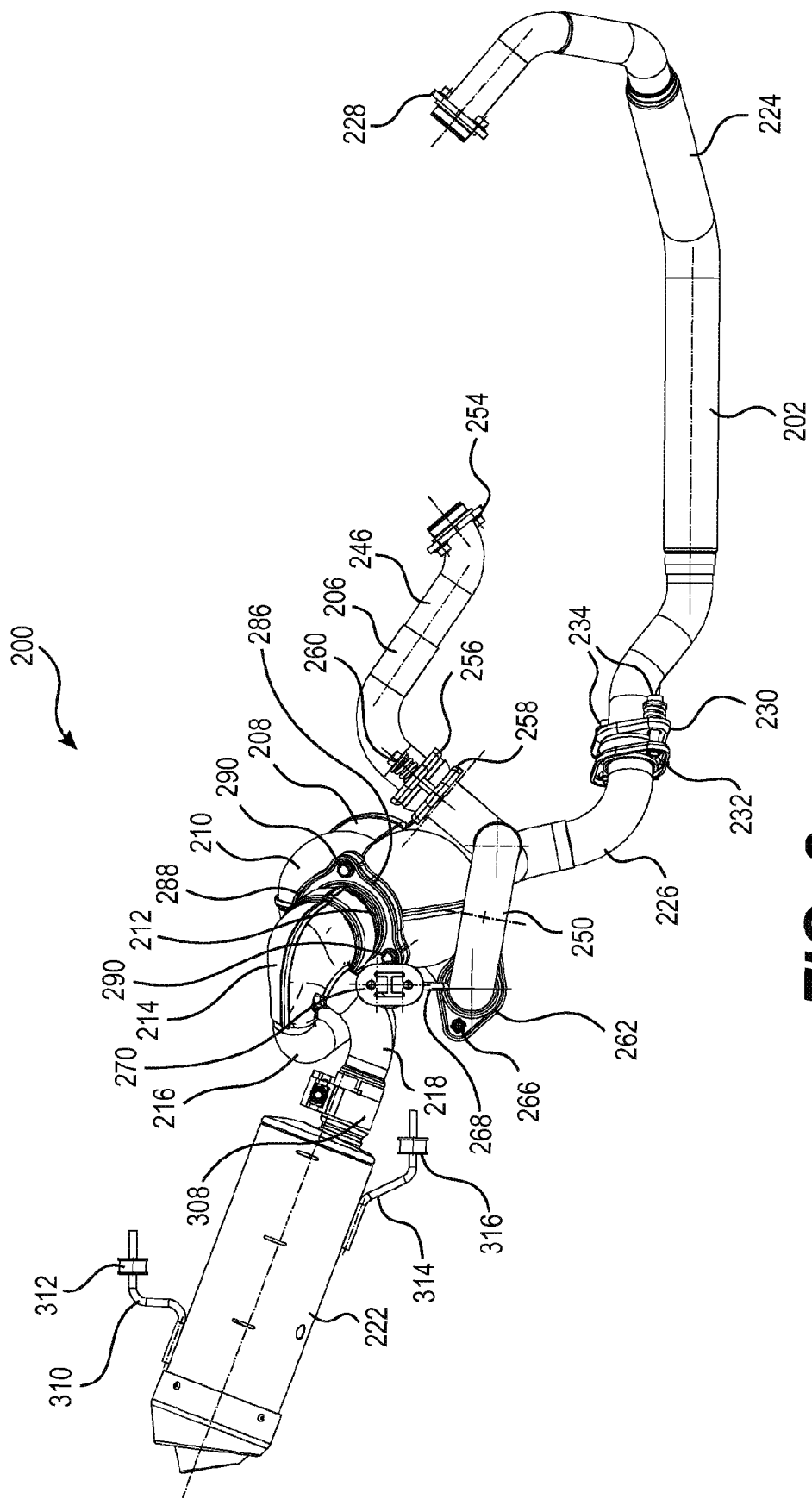
FIG. 8 is a right side elevation view of the exhaust system of FIG. 6.
Figure 9:
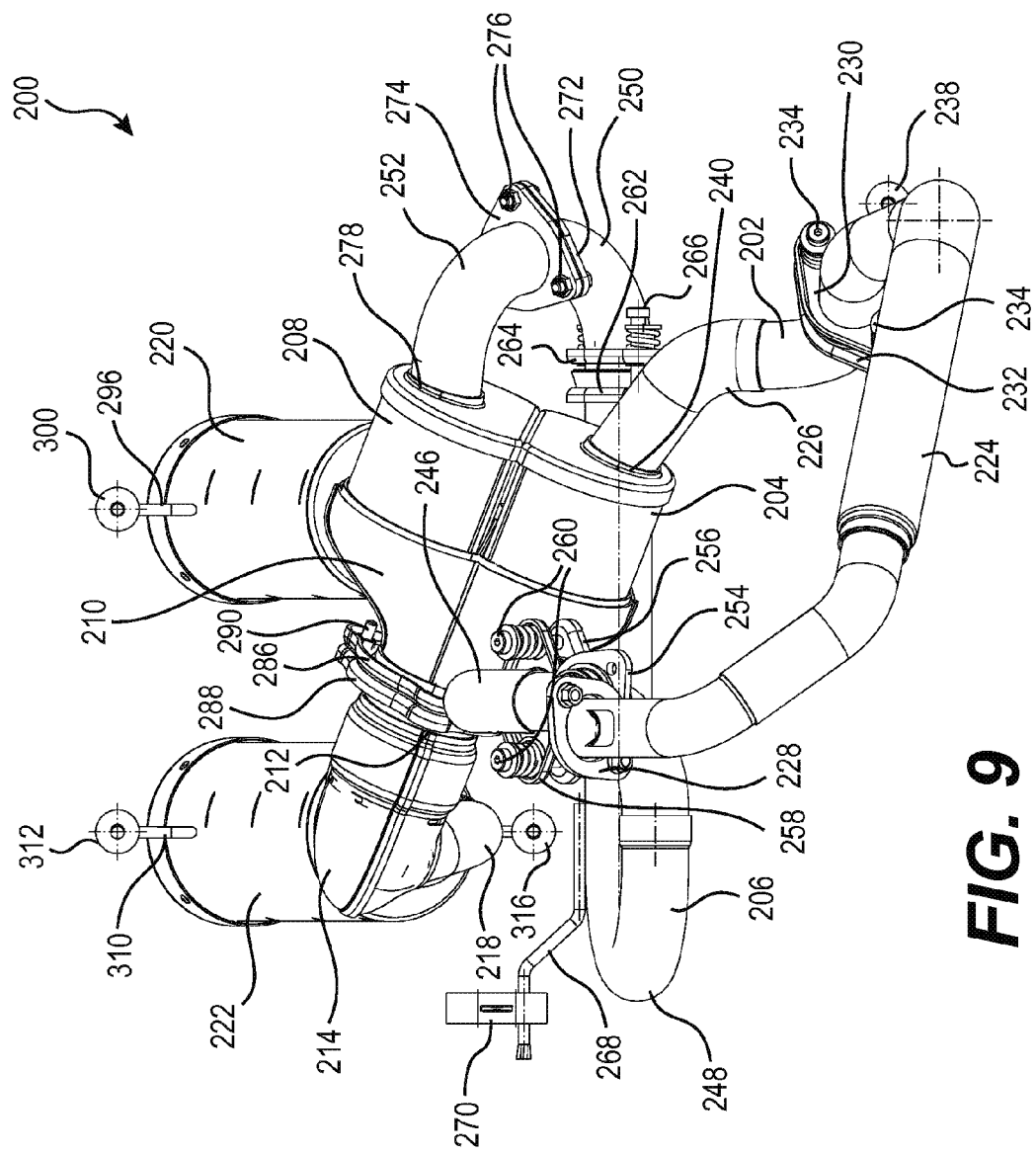
FIG. 9 is a front elevation view of the exhaust system of FIG. 6.
Figure 10:
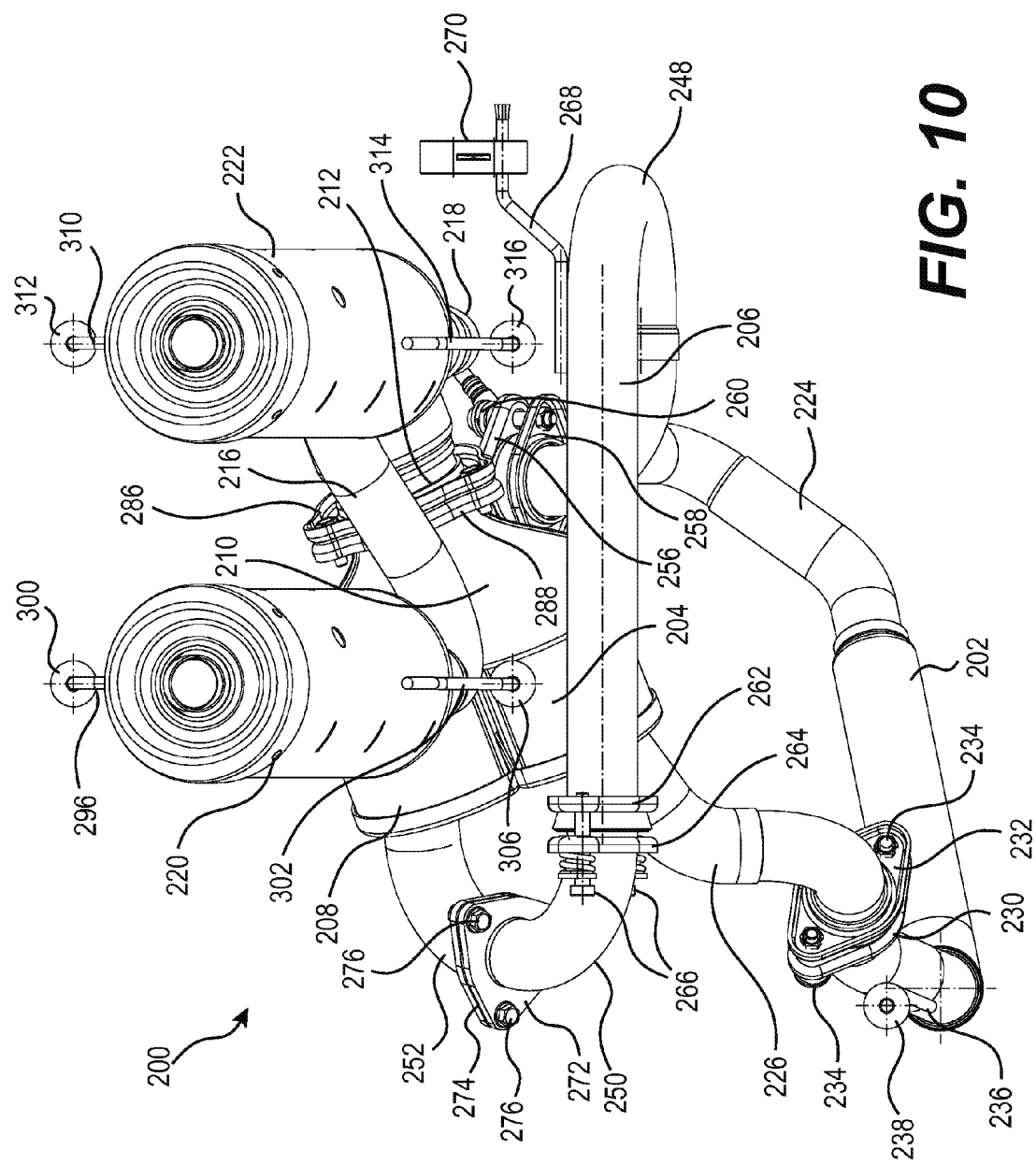
FIG. 10 is a rear elevation view of the exhaust system of FIG. 6.
Figure 11:
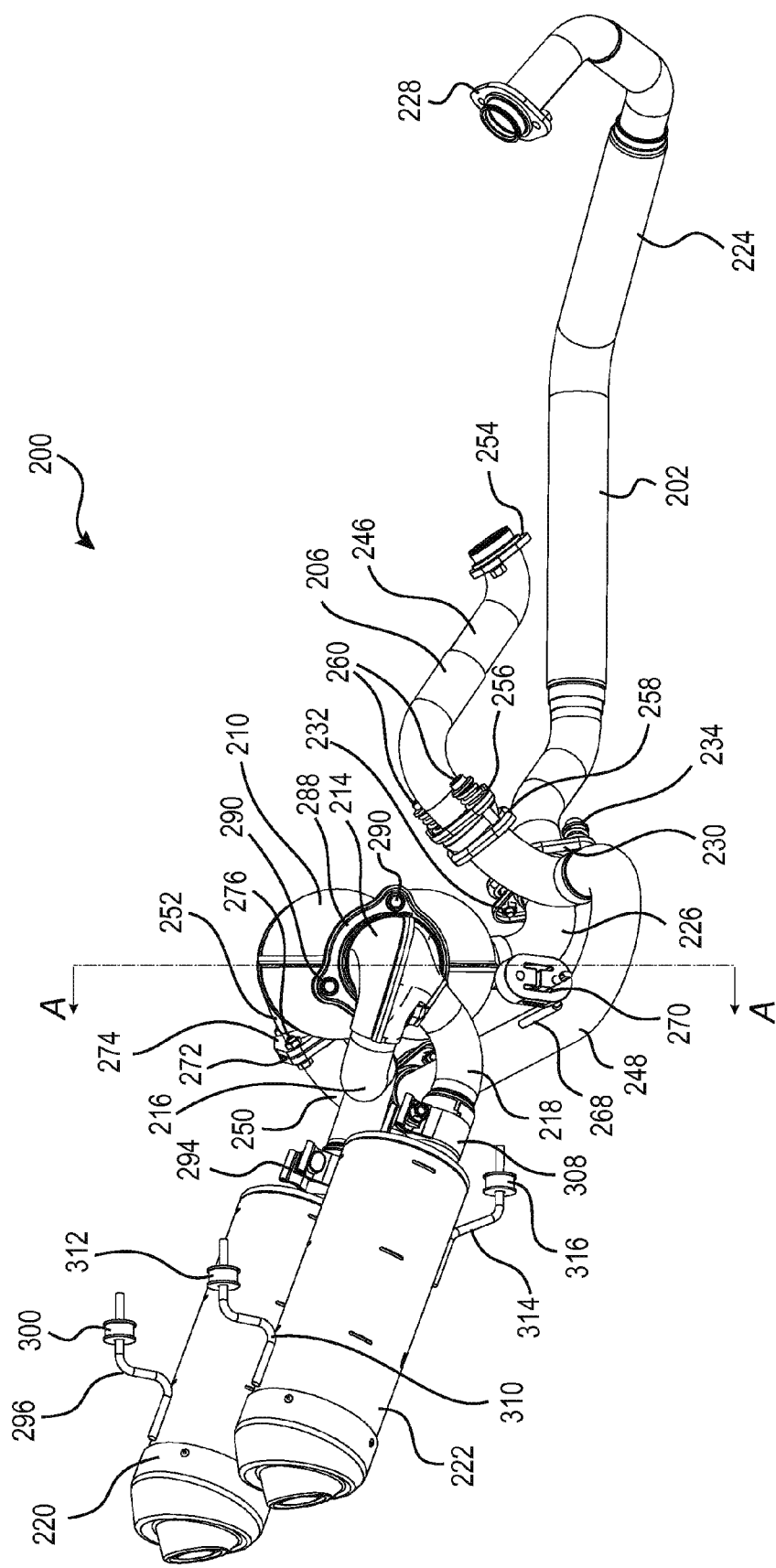
FIG. 11 is a perspective view taken from a rear, right side of the exhaust system of FIG. 6.

The exhaust pipe 218 extends through an opening disposed in the bottom of the fitting 214. From the fitting 214, the exhaust pipe 216 extends rearward and downward, and rearward and upward into the muffler 222. The downstream end of the exhaust pipe 218 is received into the muffler 222. It is contemplated that the exhaust pipe 218 could be made of multiple sections fastened together. The muffler 222 is connected to the exhaust pipe 216 by a clamp 308. The muffler 222 is disposed rearward of the collector 210 on a right side of the longitudinal centerline 134. As best seen in FIG. 8, the muffler 222 extends rearward and upward from its upstream end. The muffler 222 has a number of chambers, pipes and/or baffles defined therein. A support 310 welded to the top of the muffler 222 is used to connect the muffler 222 to the bracket 298 (FIG. 3) connected to the member 132 on the rear frame portion 80. A rubber damper 312 disposed between the support 310 and the bracket 298 reduces the transmission of vibrations between the frame 16 and the exhaust system 200. A support 314 welded to the bottom of the muffler 222 forward of the support 310 is used to connect the muffler 222 to the bracket 304 (FIG. 3) connected to the member 132. A rubber damper 316 disposed between the support 310 and the bracket 304 reduces the transmission of vibrations between the frame 16 and the exhaust system 200. As can be seen in FIGS. 2 to 5, the muffler 222 is disposed in part below the cargo rack 40.

Figure 13:
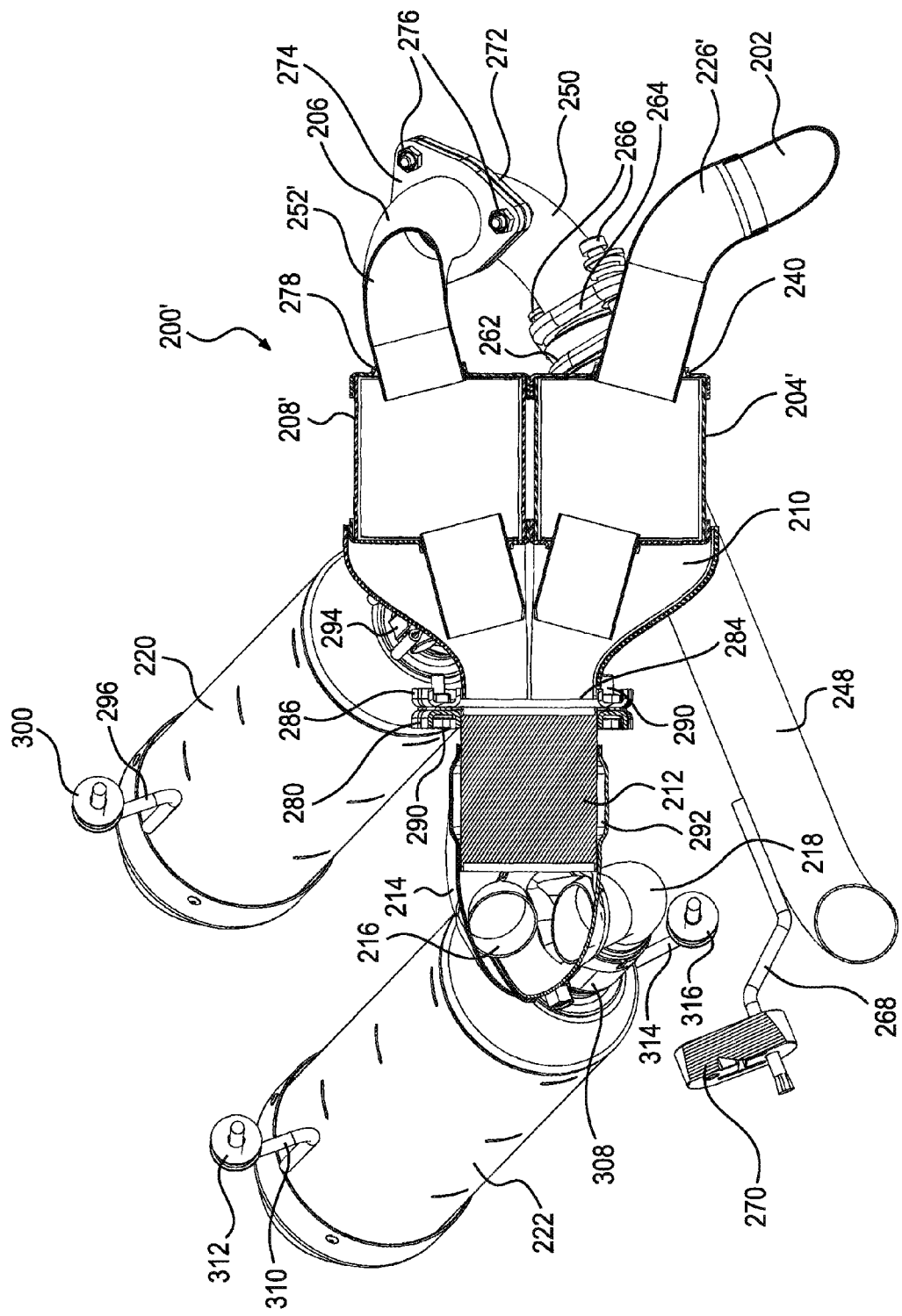
FIG. 13 is a cross-sectional view of an alternative embodiment of the exhaust system of FIG. 6 with an alternative embodiment of expansion chambers.

It is contemplated that the expansion chambers 204, 208, which are resonators, could be replaced with another type of expansion chambers. In the exhaust system 200' illustrated in FIG. 13, the expansion chambers 204, 208 have been replaced by expansion chambers 204', 208' respectively. The expansion chambers 204', 208' are mufflers. Although illustrated as each having a single chamber, it is contemplated that the expansion chambers 204', 208' could each contain multiple chambers, pipers and/or baffles. The pipe sections 226, 252 have been replaced with shorter pipe sections 226', 252'. As a result, the pipe sections 226', 252' only extend partly inside their respective expansion chambers 204', 208'. A pipe 318 connects the expansion chamber 204' with the inside of the collector 210. Similarly, a pipe 320 connects the expansion chamber 208' with the inside of the collector 210. The other elements of the exhaust system 200' are the same as those of the exhaust system 200 and have been labeled in FIG. 13 with the same reference numerals. These elements will not be described again herein.

Each main pipe section 224, 226, 246, 248, 250, 252, 226', 252' and each exhaust pipe 216, 218 is made of multiple pipe sections welded or otherwise connected together. For simplicity and clarity, these sections were not described. It is contemplated that each main pipe section 224, 226, 246, 248, 250, 252, 226', 252' and each exhaust pipe 216, 218 could also be made of a single bent pipe.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A vehicle exhaust system comprising:
a first exhaust pipe adapted to be connected to a first exhaust port of an engine;
a first expansion chamber connected to the first exhaust pipe;
a second exhaust pipe adapted to be connected to a second exhaust port of an engine;
a second expansion chamber connected to the second exhaust pipe;
a collector connected to the first and second expansion chambers, the first and second expansion chambers being received in part inside the collector;
a third exhaust pipe connected to the collector; and
a first muffler connected to the third exhaust pipe.

2. The vehicle exhaust system of claim 1, further comprising:
a fourth exhaust pipe connected to the collector; and
a second muffler connected to the fourth exhaust pipe.

3. The vehicle exhaust system of claim 1, further comprising a catalytic converter connected downstream of the collector and upstream of the third exhaust pipe.

4. The vehicle exhaust system of claim 3, wherein exhaust gases from the first and second exhaust pipes flow through the catalytic converter.

5. The vehicle exhaust system of claim 1, wherein the first and second expansion chambers are adjacent to each other.

6. The vehicle exhaust system of claim 1, wherein the first expansion chamber is a first resonator and the second expansion chamber is a second resonator.

7. The vehicle exhaust system of claim 6, wherein:
the first exhaust pipe extends through the first resonator,
the first exhaust pipe has an end disposed inside the collector,
a portion of the first exhaust pipe disposed inside the first resonator defines at least one aperture fluidly communicating the first exhaust pipe with the first resonator,
the second exhaust pipe extends through the second resonator,
the second exhaust pipe has an end disposed inside the collector, and
a portion of the second exhaust pipe disposed inside the second resonator defines at least one aperture fluidly communicating the second exhaust pipe with the second resonator.

8. The vehicle exhaust system of claim 2, wherein each of the first and second exhaust pipes is longer than each of the third and fourth exhaust pipes.

9. The vehicle exhaust system of claim 1, wherein a flow of exhaust gases inside the first exhaust pipe and the first expansion chamber is separate from a flow of exhaust gases inside the second exhaust pipe and the second expansion chamber; and
wherein the flow of exhaust gases from the first exhaust pipe and the first expansion chamber is mixed with the flow of exhaust gases from the second exhaust pipe and the second expansion chamber inside the collector.

10. A vehicle comprising:
a frame;
an internal combustion engine mounted to the frame, the internal combustion engine having a first exhaust port and a second exhaust port;
a first exhaust pipe connected to the first exhaust port;
a first expansion chamber connected to the first exhaust pipe, the first expansion chamber being disposed rearward of the engine;
a second exhaust pipe connected to the second exhaust port;
a second expansion chamber connected to the second exhaust pipe, the second expansion chamber disposed rearward of the engine;
a collector connected to the first and second expansion chambers;
a third exhaust pipe connected to the collector; and
a first muffler connected to the third exhaust pipe, the first muffler being disposed rearward of the collector.

11. The vehicle of claim 10, further comprising:
a fourth exhaust pipe connected to the collector; and
a second muffler connected to the fourth exhaust pipe, the second muffler being disposed rearward of the collector.

12. The vehicle of claim 10, further comprising a catalytic converter connected downstream of the collector and upstream of the third exhaust pipe.

13. The vehicle of claim 12, wherein exhaust gases from the first and second exhaust pipes flow through the catalytic converter.

14. The vehicle of claim 10, wherein the first and second expansion chambers are adjacent to each other.

15. The vehicle of claim 10, wherein the first and second expansion chambers are received in part inside the collector.

16. The vehicle of claim 10, wherein the first expansion chamber is a first resonator and the second expansion chamber is a second resonator.

17. The vehicle of claim 16, wherein:
the first exhaust pipe extends through the first resonator,
the first exhaust pipe has an end disposed inside the collector,
a portion of the first exhaust pipe disposed inside the first resonator defines at least one aperture fluidly communicating the first exhaust pipe with the first resonator,
the second exhaust pipe extends through the second resonator,
the second exhaust pipe has an end disposed inside the collector, and
a portion of the second exhaust pipe disposed inside the second resonator defines at least one aperture fluidly communicating the second exhaust pipe with the second resonator.

18. The vehicle of claim 11, wherein each of the first and second exhaust pipes is longer than each of the third and fourth exhaust pipes.

19. The vehicle of claim 11, wherein the first and second mufflers are disposed on opposite sides of a longitudinal centerline of the vehicle.

20. The vehicle claim 10, wherein the first and second expansion chambers each have an inlet; and
wherein the inlets are disposed on a same side of a longitudinal centerline of the vehicle.

21. The vehicle of claim 10, wherein a flow of exhaust gases inside the first exhaust pipe and the first expansion chamber is separate from a flow of exhaust gases inside the second exhaust pipe and the second expansion chamber; and
wherein the flow of exhaust gases from the first exhaust pipe and the first expansion chamber is mixed with the flow of exhaust gases from the second exhaust pipe and the second expansion chamber inside the collector.

22. A vehicle exhaust system comprising:
a first exhaust pipe adapted to be connected to a first exhaust port of an engine;
a first resonator connected to the first exhaust pipe, the first exhaust pipe extending through the first resonator;
a portion of the first exhaust pipe disposed inside the first resonator defining at least one aperture fluidly communicating the first exhaust pipe with the first resonator;
a second exhaust pipe adapted to be connected to a second exhaust port of an engine;
a second resonator connected to the second exhaust pipe, the second exhaust pipe extending through the second resonator;
a portion of the second exhaust pipe disposed inside the second resonator defining at least one aperture fluidly communicating the second exhaust pipe with the second resonator;
a collector fluidly connected to the first and second exhaust pipes, the first exhaust pipe having an end disposed inside the collector, the second exhaust pipe having an end disposed inside the collector;
a third exhaust pipe connected to the collector; and
a first muffler connected to the third exhaust pipe.

23. The vehicle exhaust system of claim 22, further comprising:
a fourth exhaust pipe connected to the collector; and
a second muffler connected to the fourth exhaust pipe.

24. The vehicle exhaust system of claim 22, further comprising a catalytic converter connected downstream of the collector and upstream of the third exhaust pipe.

25. The vehicle exhaust system of claim 24, wherein exhaust gases from the first and second exhaust pipes flow through the catalytic converter.

26. The vehicle exhaust system of claim 22, wherein the first and second resonators are adjacent to each other.

27. The vehicle exhaust system of claim 23, wherein each of the first and second exhaust pipes is longer than each of the third and fourth exhaust pipes.

28. The vehicle exhaust system of claim 22, wherein a flow of exhaust gases inside the first exhaust pipe and the first resonator is separate from a flow of exhaust gases inside the second exhaust pipe and the second resonator; and
wherein the flow of exhaust gases from the first exhaust pipe and the first resonator is mixed with the flow of exhaust gases from the second exhaust pipe and the second resonator inside the collector.

* * * * *